US008757561B2

(12) United States Patent
Cote

(10) Patent No.: US 8,757,561 B2
(45) Date of Patent: Jun. 24, 2014

(54) BICYCLE BRAKE CABLE HANGER

(76) Inventor: Alan Cote, Williston, VT (US)

( * ) Notice: Subject to any disclaimer, the term of this patent is extended or adjusted under 35 U.S.C. 154(b) by 180 days.

(21) Appl. No.: 13/327,682

(22) Filed: Dec. 15, 2011

(65) Prior Publication Data

US 2012/0153092 A1    Jun. 21, 2012

Related U.S. Application Data

(60) Provisional application No. 61/423,272, filed on Dec. 15, 2010.

(51) Int. Cl.
*F16L 3/08*    (2006.01)
(52) U.S. Cl.
USPC .............................. 248/65; 280/264; 74/502.4
(58) Field of Classification Search
USPC .......... 248/672, 49, 65, 67.5, 230.1; 280/279, 280/288.4, 276, 280, 264; 188/2 D; 74/502.4, 502.6, 551.8; 403/396; D12/114
See application file for complete search history.

(56) References Cited

U.S. PATENT DOCUMENTS

| | | | | | |
|---|---|---|---|---|---|
| 3,295,863 | A | * | 1/1967 | Jaulmes | 280/278 |
| 3,785,676 | A | * | 1/1974 | Klein, Jr. | 280/279 |
| 4,351,418 | A | * | 9/1982 | Woodring et al. | 188/24.22 |
| 4,653,768 | A | * | 3/1987 | Keys et al. | 280/279 |
| 4,695,029 | A | * | 9/1987 | Fox et al. | 248/682 |
| 5,297,811 | A | * | 3/1994 | Chi | 280/280 |
| 5,391,014 | A | * | 2/1995 | Chen | 403/74 |
| 5,445,047 | A | * | 8/1995 | Chi | 74/551.1 |
| 5,568,905 | A | * | 10/1996 | Smith, II | 248/65 |
| 5,673,878 | A | * | 10/1997 | Yamate et al. | 248/65 |
| 5,687,616 | A | * | 11/1997 | Marui | 74/551.1 |
| 5,775,709 | A | * | 7/1998 | Chen | 280/279 |
| 5,927,740 | A | * | 7/1999 | Hopey | 280/272 |
| 6,015,118 | A | * | 1/2000 | Oda | 248/65 |
| 6,039,499 | A | * | 3/2000 | Chiang | 403/78 |
| 6,270,042 | B1 | * | 8/2001 | Ando | 248/65 |
| 6,330,989 | B1 | * | 12/2001 | Okamoto | 248/74.1 |
| 6,408,714 | B1 | * | 6/2002 | Kuo | 74/551.1 |
| 6,439,800 | B1 | * | 8/2002 | Chen | 403/396 |
| 7,216,881 | B2 | * | 5/2007 | Wesling | 280/276 |
| 7,533,867 | B1 | * | 5/2009 | Chiang | 254/231 |
| 7,810,614 | B1 | * | 10/2010 | Li | 188/2 D |
| 8,459,681 | B2 | * | 6/2013 | Chamberlain | 280/288.4 |
| 2009/0218785 | A1 | * | 9/2009 | Tsai et al. | 280/279 |
| 2011/0297797 | A1 | * | 12/2011 | Yelverton et al. | 248/70 |
| 2013/0076000 | A1 | * | 3/2013 | Man | 280/279 |

* cited by examiner

*Primary Examiner* — Bradley Duckworth
(74) *Attorney, Agent, or Firm* — Alan Coté; Green Mountain Innovations

(57) ABSTRACT

The invention relates to a stop, or hanger, for a brake cable of a bicycle. The lever and caliper of a bicycle brake are connected by a Bowden-type cable, with an inner wire and an outer housing. The invention describes a stop for the outer cable housing that mounts underneath the crown race component of a bicycle's headset bearings. A washer-shaped piece sits under the crown race, with a forward section connected to the front of the washer section that extends upward. The top of the forward section includes a hole or slot that serves as a stop for a brake cable housing. A reinforcing web of material may wrap laterally from the outside of the washer portion to the forward section to prevent unwanted flex of the stop under high braking loads. An alternate version integrates the hanger and crown race into one piece.

6 Claims, 3 Drawing Sheets

BICYCLE BRAKE CABLE HANGER

CROSS-REFERENCE TO RELATED APPLICATION

This application claims priority to provisional application No. 61/423,272, filed Dec. 15, 2010

FEDERALLY-SPONSORED RESEARCH

None
Docket: CableHanger Dec. 15, 2011

BACKGROUND

1. Field of the Invention

The present invention relates to a stop, or hanger, for a brake cable of a bicycle. The lever and caliper of a bicycle brake are connected by a Bowden-type cable, with an inner wire and an outer housing. The wire slides inside the housing and actuates the brake, while the housing stays stationary. Some styles of bicycle brakes require a cable hanger for the housing, separate from the brake caliper. The present invention describes a new and improved design for a brake cable hanger.

2. Description of Related Art

Numerous ways of configuring a cable hanger for bicycle brakes have been used in the past. This invention relates specifically to a cable hanger for the front brake of a bicycle, where the brake itself does not include a cable stop or hanger, such as cantilever-style brakes.

Different styles of front brake cable hangers are known to exist. One style uses a hanger that mounts into the upper bearing assemble of a bicycle's headset. This style hanger is typically inserted as washer above the upper bearing assembly of the headset. An alternate version of this style integrates the cable hanger with the upper bearing cup of the headset, such as the Orbit IS-CX with Integrated Hanger, made by FSA. Another cable hanger design uses a 90 degree elbow and housing stop built into the underside of the handlebar stem. Another method is a hole of appropriate diameter drilled through the handlebar stem to allow passage of the wire, but not the housing. Cable hangers are also used that mount to the fork crown of the bicycle.

BRIEF SUMMARY OF THE INVENTION

The present invention relates specifically to a cable hanger for the front brake of a bicycle, where the brake itself does not include a cable stop or hanger, such as cantilever-style brakes. The invention describes a cable hanger that mounts underneath the crown race component of a bicycle's headset bearings. A ring-shaped, or washer-shaped piece sits under the crown race, with an forward section on the front of the washer section that extends upward. The top of the forward section includes a hole or slot that serves as a stop for a brake cable housing. A reinforcing web of material may wrap laterally from the outside of the ring portion to the forward section to prevent unwanted flex of the stop under high braking loads. An alternate version integrates the hanger and crown race into one piece.

DETAILED DESCRIPTION OF THE INVENTION

The present invention relates specifically to a cable hanger for the front brake of a bicycle, where the brake itself does not include a cable stop or hanger, such as cantilever-style brakes. The invention may be compatible with other styles of brakes in addition to cantilevers.

With cantilever brakes, it is desirable for the cable housing to terminate as closely as possible to the yoke/junction point of the cantilever straddle wire, leaving a short section of unsheathed wire. Placing the cable hanger on the upper assembly of the headset bearing, or using the handlebar stem as a cable stop, creates a long section of wire with no housing. Under some braking conditions, this bare, unsheathed section of cable can combine with the flexing of the fork blade to create brake chatter. Brake chatter occurs when the brake pads cyclically grab and then disengage from the braking surface on the bicycle wheel, which results in poor braking control. Placing the cable hanger close to the cantilever straddle wire reduces the length of unsheathed cable and thus significantly reduces brake chatter.

In addition, frequently there are clearance issues with cables that are routed through a cable hanger that is mounted to the bicycle's stem, or to a hanger mounted to the upper headset bearing assembly. The closer the cable hanger is to the stem, the smaller the radius is of the 90 degree bend the cable must make A small radius bend creates more friction between the wire and the housing portions of the cable assembly, with resulting reduced performance.

What is needed therefore, is a cable hanger that allows the housing to terminate close to the cantilever straddle wire.

Figure 1:
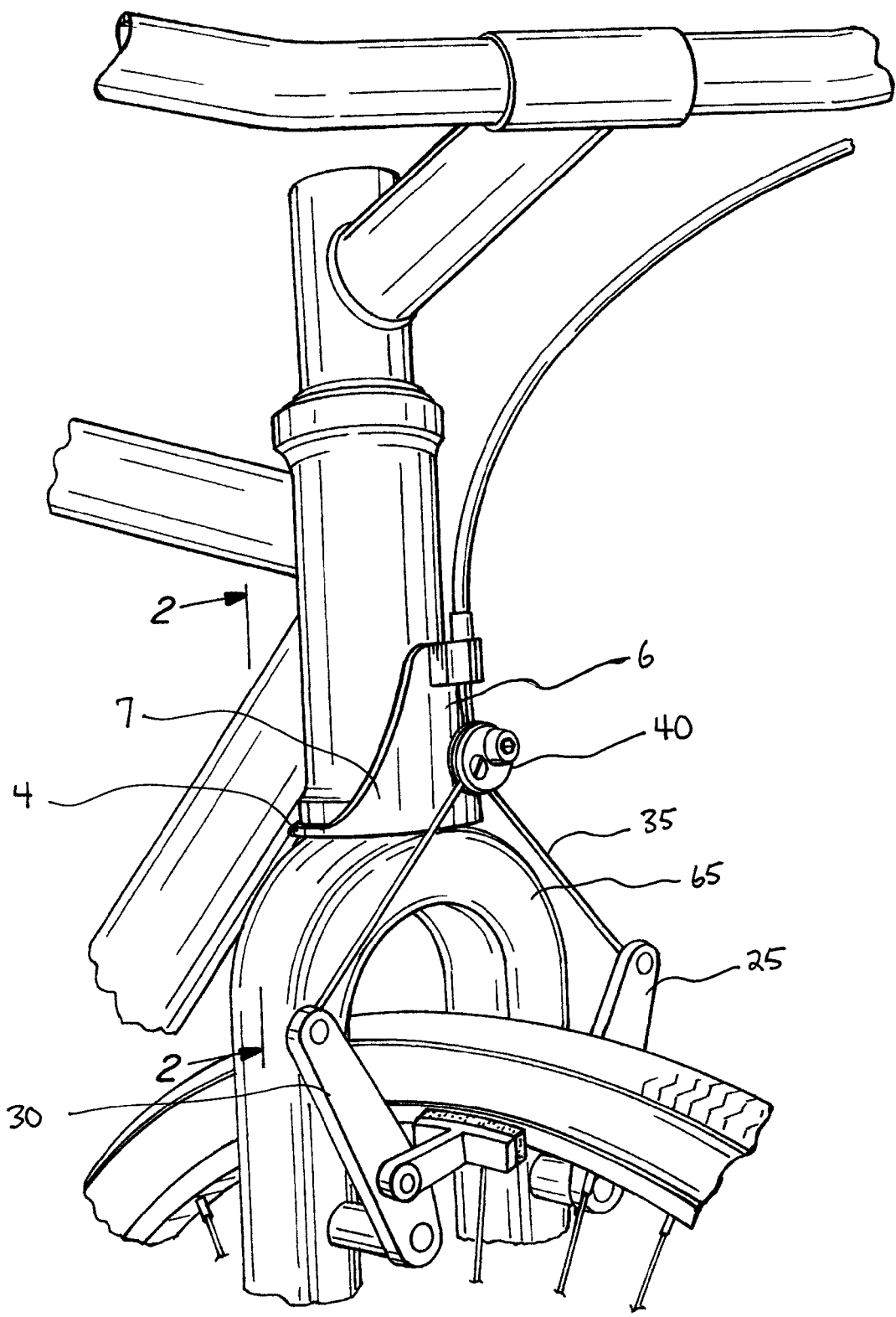
FIG. 1 shows an isometric view of the device installed on a bicycle

FIG. 1 shows one embodiment of the invention installed on a bicycle. In this embodiment, cable hanger overall 2 is seen mounted under the crown race of the bicycle headset assembly. As can be seen, cable hanger overall 2 is located in the lower portion of the headset assembly, which is the headest portion positioned on the bottom end of the bicycle's headtube. This in contrast to the upper portion of the headset assembly, also described above as an upper bearing assembly, which is positioned on the top end of the bicycle's headtube. The crown race is obscured in FIG. 1. Here, washer section 4 encircles the bicycle's steerer tube 60 (shown in FIG. 2), the steerer being the tube that is part of the bicycle fork and extends upward from fork crown 65. The dimensions of cable hanger forward section 6 are such that this section clears and does not rub or interfere with lower bearing cup 50. Cup 50 is pressed into head tube 55. Some bicycles may integrate cup 50 into the frame, and thus it may not be a press-in piece. Forward section 6 is joined to the washer section's outer edge.

FIG. 1 includes cable hanger web section 7. Web section 7 is present on both the right and left sides of forward section 6, and wraps laterally from the outside of washer section 4 to the upper portions of forward section 6 to reduce unwanted flex of the stop under high braking loads. Web section 7, which connectedly wraps from the forward section back around a portion of the circumference of washer section 4, both to the right and the left of the forward section. Here, forward section 6 and web section 7 are formed of one continuous piece. However, they may be separate pieces that are joined together.

Figure 4:
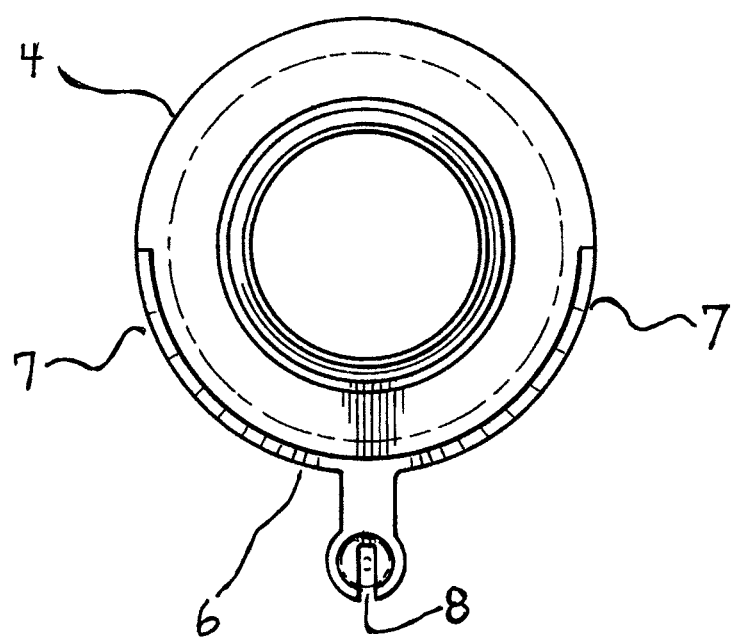
FIG. 4 shows a top view of the device

As the purpose of web section 7 is to provide additional stiffness such that brake wire slot 8 does not flex downward under high braking loads, the exact configuration of web section 7 can vary from that shown in FIG. 1. For instance, the web section 7 may wrap further or less far around the perimeter of washer section 4, and its profile of joining forward section 6 may also vary. As shown in FIG. 4, web section 7 creates an approximately 180 degree arc on washer section 7, but this arc could be different, such as 90 degrees of wrap. Likewise, washer section 4, forward section 6, and web section 7 may all be formed from a single piece of metal. This may be in the form of a casting, a forging, or a molded piece of material. Likewise, the forward section and/or web section may include reliefs or cut-outs to reduce weight, or to create stylized designs such as cut-out letters or logos. The profile of web section 7 must, however, prevent it from rubbing against or otherwise interfering with cup 50.

Alternately, the forward section may be made of material of sufficient stiffness to effectively negate the use of the web section 7. In this embodiment, forward section 6 extends upwards from washer section 4, with forward section 7 even as narrow as cable stop 22. In this case, forward section 7 may wrap only a few degrees around the circumference of washer section 4.

FIG. 1 shows the invention installed on a bicycle. A brake lever, not shown, when operated pulls wire 15 relative to housing 10. The actuation of wire 15 causes right cantilever brake arm 25 and left cantilever brake arm 30 to move towards the rim of the bicycle wheel.

Figure 2:
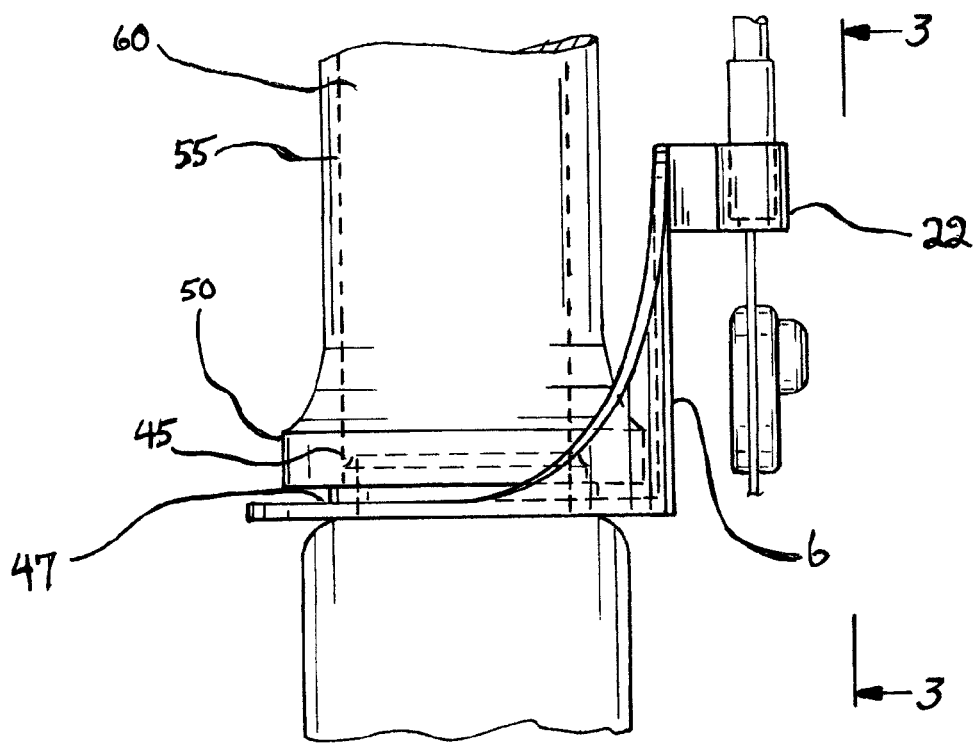
FIG. 2 shows a side view of the device installed on a bicycle

FIG. 2 shows a sideview of the installed cable hanger 2. Headtube 55 of the bicycle is seen to house lower bearing cup 50. Crown race 45 is seen mounted on top of hanger 2. It is advantageous for washer section 4 to have minimal thickness. This is because it must be placed underneath crown race 45. Crown race 45 normally is press-fit to a machined section on the top of the bicycle's fork. This machined section is normally 5-10 mm. Therefore, washer section 4 being no more than several millimeters thick will still allow crown race 45 to press-fit normally on the machined section of the fork. However, the thickness of the washer section must be sufficient enough to prevent unwanted flex of the overall hanger under the high cable forces needed for heavy braking. FIG. 2 shows steerer tube 60 as hidden lines.

FIG. 2 shows forward section 6 as substantially perpendicular to washer section 4. The circular hollow portion of cable stop 22 is then spaced away (while still physically connected) from the forward section, to align over right brake arm 25 and left brake arm 30 (25 and 30 not shown here). However, forward section 6 may be angled slightly relative to headtube 55, such that the hollow portion of stop 22 is not spaced away from forward section 6. This slight angling is considered for these purposes to still be substantially perpendicular.

Figure 3:
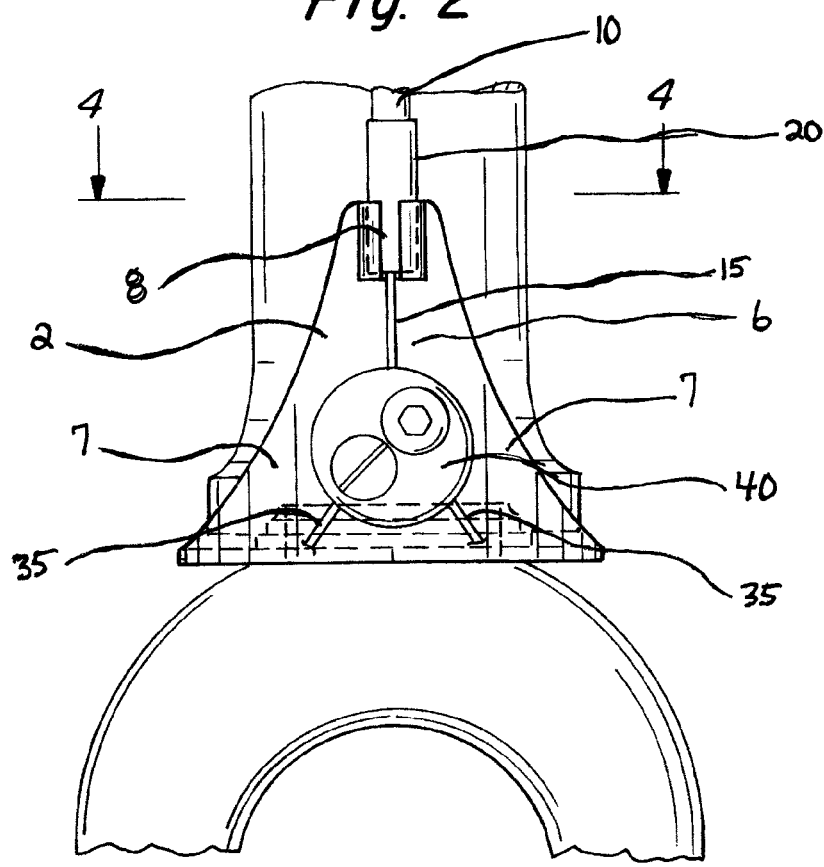
FIG. 3 shows a front view of the device installed on a bicycle

In FIG. 3 brake wire slot 8 is shown, which serves as the end of the brake housing 10, with cable ferrule 20 sandwiched between the two parts, as is common practice in bicycle mechanics. Brake wire 15 continues down to yoke 40, where wire 15 joins to straddle wire 35.

FIG. 4 shows a top view of cable hanger 2 by itself, not installed on a bicycle. Cable hanger washer section 4 is shown, which has an absence of material in its center to slip around the steerer tube of the bicycle's fork. The crown race (45, not shown) then mounts on top of washer section 4. Cable hanger forward section 6 and brake wire slot 8 are shown.

In another embodiment of the invention, washer section 4 and crown race 45 are integrated together. In this embodiment the assembly is fabricated as a single piece, with forward section 6 extending directly from crown race 45, with washer section 4 effectively not needed. It is advantageous for this embodiment to be built as part of a complete bicycle headset bearing assembly. However, it also is possible to create a new integrated crown race/cable hanger that can be retrofit to existing bicycle headsets. This embodiment is effectively pictured in FIG. 2, if crown race 45 and washer section 4 are made of a single piece of material.

In all embodiments, the height of forward section 6 is such that brake wire slot 8 is far enough above yoke 40 such that there's clearance between yoke 40 and slot 8 even when the brake is applied with maximum force. In the preferred embodiment, forward section 6 is 40 mm long, measured from the center of washer section 4 to the center of wire slot 8. Of course, other lengths may be used as well, so long as clearance is maintained as described.

Cable hanger 2 can be manufactured from a variety of materials, including metals such as steel, aluminum, or titanium, as well as composite materials such as carbon fiber. Appropriate manufacturing methods, as known in the art, can be employed, such as stamping, machining, casting, etc.

What is claimed:

1. An apparatus for a bicycle, comprising:
   a washer section in a lower portion of a headset assembly encircling a bicycle's steerer tube;
   a forward section, a lower portion of said forward section connected to said washer section's outer edge, said forward section extending upward in a direction substantially perpendicular to said washer section;
   a brake cable stop for a front brake, said brake cable stop located on an upper portion of said forward section;
   said apparatus turning in unison with said bicycle's steering assembly when said steering assembly is turned, said steering assembly including a fork, a front wheel, a front brake and handlebars.

2. The apparatus of claim 1 in which said washer section and a crown race are one piece.

3. The apparatus of claim 1 in which said washer section is separate from and mounted below a crown race.

4. An apparatus for a bicycle, comprising:
   a washer section in a lower portion of a headset assembly encircling a bicycle's steerer tube;
   a forward section, a lower portion of said forward section connected to said washer section's outer edge, said forward section extending upward in a direction substantially perpendicular to said washer section;
   right and left reinforcing web sections, each said web section connectedly wrapping latterly from an upper portion of said forward section to right and left circumferential portions of said washer section's outer edge;
   a brake cable stop for a front brake, said brake cable stop located on an upper portion of said forward section;
   said apparatus turning in unison with said bicycle's steering assembly when said steering assembly is turned, said steering assembly including a fork, a front wheel, a front brake and handlebars.

5. The apparatus of claim 4 in which said washer section and a crown race are one piece.

6. The apparatus of claim 4 in which said washer section is separate from and mounted below a crown race.

* * * * *